US006607255B2

(12) United States Patent
Bond, III et al.

(10) Patent No.: US 6,607,255 B2
(45) Date of Patent: Aug. 19, 2003

(54) COLLISION MITIGATION BY BRAKING SYSTEM

(75) Inventors: John Vincent Bond, III, Inkster, MI (US); Gerald H Engelman, Plymouth, MI (US); Jonas Ekmark, Olofstorp (SE); Jonas L. Z. Jansson, Gothenburg (SE); M. Nabeel Tarabishy, Walled Lake, MI (US); Levasseur Tellis, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/050,987

(22) Filed: Jan. 17, 2002

(65) Prior Publication Data

US 2003/0132666 A1 Jul. 17, 2003

(51) Int. Cl.[7] ................................................. B60T 8/32
(52) U.S. Cl. ...................................................... 303/193
(58) Field of Search ................................ 303/191, 193; 701/301, 96

(56) References Cited

U.S. PATENT DOCUMENTS

| 4,073,359 A | 2/1978 | Fujiki et al. |
| 4,146,108 A | 3/1979 | Sato |
| 5,420,792 A | 5/1995 | Butsuen et al. |
| 5,467,284 A | 11/1995 | Yoshioka et al. |
| 5,485,892 A | 1/1996 | Fujita |
| 5,635,922 A | 6/1997 | Cho et al. |
| 5,699,040 A | 12/1997 | Matsuda |
| 5,924,508 A | 7/1999 | Clauss et al. |
| 5,941,608 A | 8/1999 | Campau et al. |
| 5,952,939 A | 9/1999 | Nakazawa et al. |
| 6,070,682 A | 6/2000 | Isogai et al. |
| 6,084,508 A | 7/2000 | Mai et al. |
| 6,085,151 A * | 7/2000 | Farmer et al. ............... 701/301 |
| 6,105,705 A | 8/2000 | Faye |
| 6,131,063 A | 10/2000 | Seki et al. |
| 6,189,987 B1 | 2/2001 | Shimizu |
| 6,226,593 B1 | 5/2001 | Kurz et al. |
| 6,282,483 B1 * | 8/2001 | Yano et al. .................... 701/96 |
| 2001/0018641 A1 * | 8/2001 | Kodaka et al. ............. 701/301 |
| 2002/0016659 A1 * | 2/2002 | Tashiro et al. ................ 701/48 |

* cited by examiner

Primary Examiner—Christopher P. Schwartz
(74) Attorney, Agent, or Firm—Frank A. MacKenzie

(57) ABSTRACT

A brake control system (10) for an automotive vehicle (12) is provided. The system (10) includes a vehicle sensor complex (16) that generates a vehicle sensor complex signal and an object detection system (14) that generates an object detection signal. A brake controller (22) is electrically coupled to the vehicle sensor complex and the object detection system. The controller (22) in response to the vehicle sensor complex signal and the object detection signal generates a brake ramping control signal. Controller (22) adjusts brake pressure in response to the brake ramping control signal. A method for performing the same is also provided.

21 Claims, 2 Drawing Sheets

COLLISION MITIGATION BY BRAKING SYSTEM

TECHNICAL FIELD

The present invention relates generally to collision avoidance and warning systems, and more particularly to a method and apparatus for autonomously controlling vehicle braking during a potential collision situation.

BACKGROUND OF THE INVENTION

Collision warning and countermeasure systems are becoming more widely used. Collision warning systems provide a vehicle operator knowledge and awareness of objects or vehicles within a close proximity so as to prevent colliding with those objects. Countermeasure systems exist in various passive and active forms. Some countermeasure systems are used to aid in prevention of a collision while others are used to aid in the prevention of injury to a vehicle operator.

Collision warning systems and countermeasure systems currently exist in various forms. Certain collision warning systems and countermeasure systems are able to sense a vehicle or object in the close proximity to a host vehicle and warn the host vehicle operator, such that the operator can take precautionary steps to prevent a collision or injury. Other collision warning systems and countermeasure systems activate passive or active countermeasures such as air bags, load limiting seat belts, or brake control whereby the system itself aids in preventing a collision or injury.

Active countermeasure systems such as brake control systems are used to apply brake pressure when an impending collision has a high probability of occurring. In situations when the operator is not aware of an impending collision the brake control system autonomously decreases the velocity of the vehicle.

Although vehicles containing brake control systems are desired over vehicles that do not because of their added safety enhancement benefits, brake control systems do have several disadvantages. Traditionally, brake control is performed through the use of a brake control system by activating or deactivating brake pressure at a predetermined constant pressure. The activation of brake control in this manner can be perceived by a vehicle operator to be abrupt and uncharacteristic of normal operator driving behaviors.

Additionally, when brake control is being activated the operator may either continue to allow the vehicle to control the brake pressure or disengage the brake control in which case the vehicle is no longer able to apply brake pressure. For this reason the operator has a choice during a potential collision situation. The operator may allow the vehicle to continue to decrease in velocity at the same rate or disengage the brake control system followed by manually applying increased brake pressure. By allowing the vehicle to continue to brake at the same rate the vehicle velocity may not decrease enough to avoid a collision. Alternatively, by deactivating the brake control system, thereby decreasing the amount of available brake time, the vehicle velocity may also not decrease to a velocity so as to avoid a collision. Also, in order for the vehicle to reactivate brake control after the potential collision situation the operator may be required consciously to remember to reactivate the brake control system.

Once more, traditional brake control systems can restrict operator control over the vehicle by requiring the operator to deactivate the brake control system in a situation where the operator chooses to accelerate to avoid a collision rather than brake. In a collision impending situation reaction time is critical, therefore by requiring the operator to deactivate brake control before performing other precautionary measures may decrease the probability of avoiding a collision.

An ongoing concern for safety engineers is to provide a safer automotive vehicle with increased collision warning and safety countermeasure intelligence as to not only decrease the probability of a collision or an injury but also to autonomously control a vehicle in such a manner, as to which a vehicle operator is accustomed to while in a vehicle. Therefore, it would be desirable to provide an improved brake control system as to control a vehicle braking system in a more "driverlike" fashion.

SUMMARY OF THE INVENTION

The foregoing and other advantages are provided by a method and apparatus for autonomously controlling vehicle braking during a potential collision situation. A brake control system for an automotive vehicle is provided. The system includes a vehicle sensor complex that generates a vehicle sensor complex signal and an object detection system that generates an object detection signal. A brake controller is electrically coupled to the vehicle sensor complex and the object detection system. The controller in response to the vehicle sensor complex signal and the object detection signal generates a brake ramping control signal. Controller adjusts brake pressure in response to the brake ramping control signal. A method for performing the same is also provided.

One of several advantages of the present invention is that it provides autonomous braking via a brake ramping control signal. Thereby, providing autonomous braking with smooth transitions.

Another advantage of the present invention is that it allows the operator to have continuous control of the braking system during a potential collision situation.

Furthermore, the present invention provides a brake control system that allows brake pressure to be released using several options so as not to increase reaction time due to deactivating the brake control system. Therefore, decreasing the probability of a collision occurring by providing the operator with potentially more time to react and perform appropriate precautionary actions.

The present invention itself, together with attendant advantages, will be best understood by reference to the following detailed description, taken in conjunction with the accompanying figures.

BRIEF DESCRIPTION OF THE DRAWING

For a more complete understanding of this invention reference should now be had to the embodiments illustrated in greater detail in the accompanying figures and described below by way of examples of the invention wherein.

DETAILED DESCRIPTION OF THE PREFERRED EMBODIMENT

While the present invention is described with respect to a method and apparatus for autonomously controlling vehicle braking during a potential collision situation, the present invention may be adapted to be used in various systems including: forward collision warning systems, collision avoidance systems, vehicle systems, or other systems that may require brake control.

In the following description, various operating parameters and components are described for one constructed embodiment. These specific parameters and components are included as examples and are not meant to be limiting.

Also in the following description, the term "ramping" does not necessarily refer to increasing an amount at a constant rate. Ramping refers to smooth, as opposed to abrupt, transitional increases or decreases in amount. For example, a sinusoidal curve has ramping portions that are increasing in magnitude and other ramping portions that are decreasing in magnitude, with varying slope. In other words when applying the defined ramping to brake pressure, ramping does not refer to abrupt changes in brake pressure. Abrupt changes in brake pressure may be perceived to a vehicle occupant as uncharacteristic of normal methods of operating a vehicle.

Figure 1:
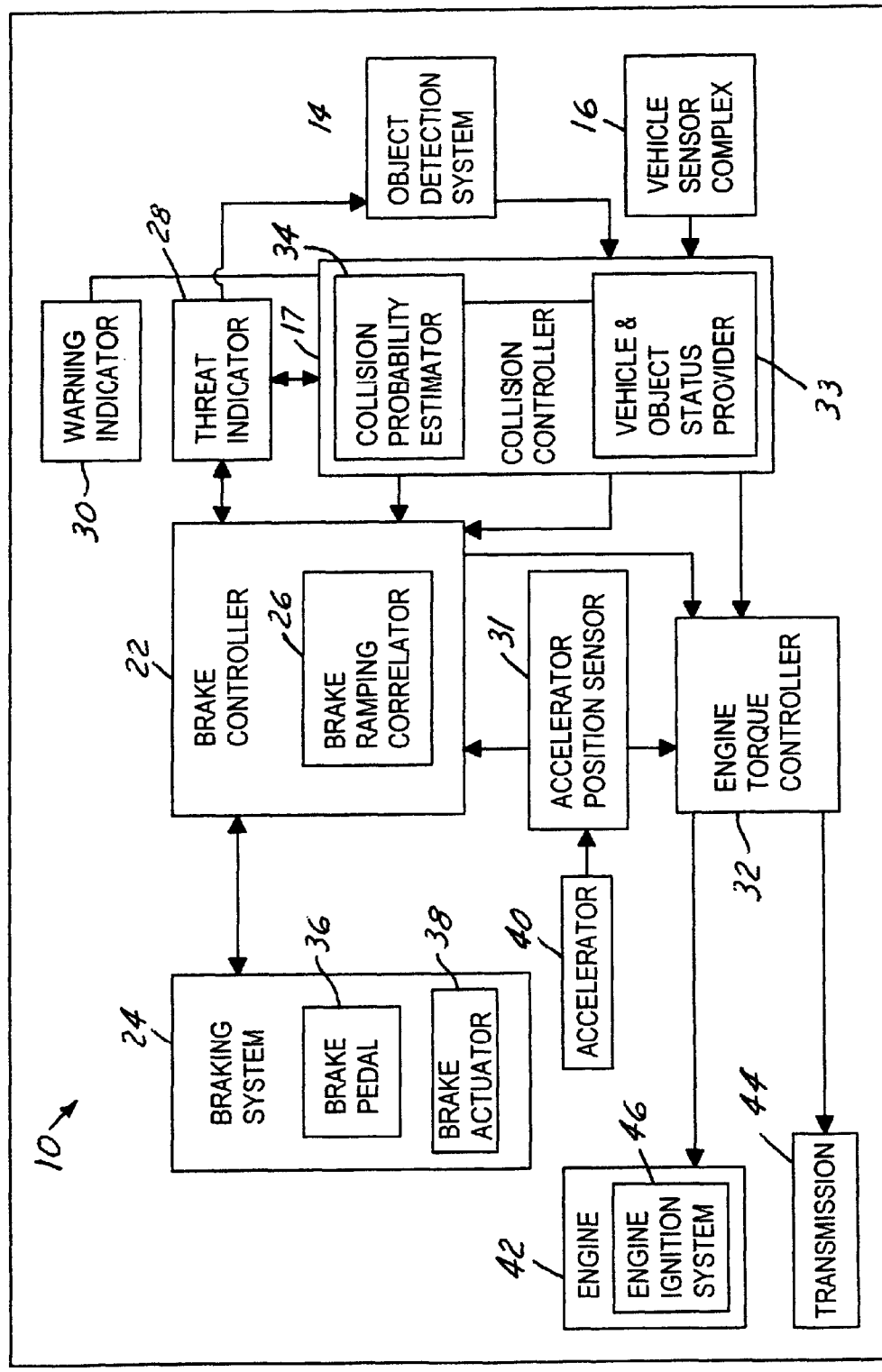
FIG. 1 is a block diagrammatic view of a brake control system for an automotive vehicle in accordance with an embodiment of the present invention.

Referring now to FIG. 1, a block diagrammatic view of a brake control system 10 for an automotive vehicle 12 in accordance with an embodiment of the present invention is shown. The system 10 includes an object detection system 14 and a vehicle sensor complex 16. The object detection system 14 detects an impending object in close proximity to the vehicle 12 and generates an object detection signal. The vehicle sensor complex 16 includes multiple vehicle sensors that are used to describe several vehicle parameters and generate a vehicle sensor complex signal. A collision controller 17 is electrically coupled to the object detection system 14 and the vehicle sensor complex 16. The collision controller 17 evaluates the object detection signal and the vehicle sensor complex signal and generates a collision assessment signal. A brake controller 22 electrically coupled to the collision controller 17 and a braking system 24, in response to the collision assessment signal, signals the braking system 24 to adjust braking pressure. The brake pressure is adjusted using a brake ramping control signal via a brake ramping correlator 26, which is contained in the brake controller 22. The brake ramping control signal provides smooth transitional braking when impending objects are detected. The brake control system 10 further includes a threat indicator 28, a warning indicator 30, an accelerator position sensor 31, an engine torque controller 32, and other related components.

The object detection system 14 may be as simple as a single motion sensor or a single accelerometer or may be as complex as a combination of multiple motion sensors, accelerometers, cameras, and transponders. The object detection system 14 may contain any of the above mentioned sensors and others such as radar, lidar, ultrasonic, active infrared, passive infrared, telematic, or other sensors known in the art.

The vehicle sensor complex 16 is a conglomerate of various vehicle system sensors including: a brake position sensor, a throttle position sensor, an inertial sensor, a steering sensor, a suspension sensor, a tire pressure sensor, a vehicle inertial sensor, a wheel speed sensor, a vehicle speed sensor, an occupant position sensor, a seat belt sensor, an occupant classification sensor, accelerometers, a pedal sensor, a seat track sensor, a steering column sensor, a yaw rate sensor, or other vehicle sensors. The above sensors may be used individually, separately, or in conjunction with each other in generating the vehicle sensor complex signal.

The collision controller 17 includes a vehicle and object status provider 33 and a collision probability estimator 34.

The status provider 33 determines an object position relative to the vehicle 10, an object velocity relative to the vehicle 10, and other object identification parameters known in the art to generate a object status signal. The status provider 33 also uses the vehicle sensor complex signal to evaluate the current status of the vehicle 12 and generate a vehicle status signal including multiple vehicle parameters from sensors stated above.

The collision probability estimator 34 determines the potential for a collision between the vehicle 12 and an object. The collision probability estimator 34 gathers various data from multiple signals, such as the object detection signal and the vehicle sensor complex signal to assess the environment and current situation that the vehicle 12 is encountering. The collision probability estimator 34 in response to the environment and a current situation determines whether any actions should be performed. The actions may include signaling the brake controller 22, the threat indicator 28, or the warning indicator 30 of an impending potential collision, or may determine not to perform any action.

Collision probability estimator 34 generates various object-related information from the various sensors within the object detection system 14 and the vehicle sensor complex 16 including: a probability that a collision may occur, time until a potential collision may occur, point of collision, impending object prioritization, object identification, and other object related parameters. Point of collision refers to a spatial window where a collision may occur. All of the above information may be included in the collision assessment signal and further used within other system components as to prevent a collision or injury.

The brake controller 22, as well as the collision controller 17 and the engine torque controller 32, are preferably microprocessor based such as a computer having a central processing unit, memory (RAM and/or ROM), and associated input and output buses. The brake controller 22, the collision controller 17, and the engine torque controller 32 may be a portion of a central vehicle main control unit, an interactive vehicle dynamics module, a restraints control module, a main safety controller, or a stand-alone controller.

The brake controller 22 includes the brake ramping correlator 26. The brake ramping correlator 26 determines an appropriate ramping curve for a current situation in response to the vehicle status signal, the object status signal, and the collision assessment signal. The ramping curve represents an amount of brake pressure over time to be applied by the braking system 24, thereby adjusting brake pressure using a smooth transitions, from a first brake pressure to a second brake pressure, rather than a more traditional abrupt technique. The ramping curve may be of varying shape and represent increasing, decreasing, or a combination of increasing and decreasing brake pressure rate adjustments.

The braking system 24 includes a brake pedal 36 and a brake actuator 38. The brake pedal 36 has various positions corresponding to various brake pressure levels. The braking system autonomously controls the brake pressure by signaling the actuator 38. The braking system 24 and the brake controller 22 during application of autonomous brake pressure allows operator intervention. The operator may increase brake pressure by depressing the brake pedal 36 to a position that corresponds to a brake pressure that is greater than the current autonomous brake pressure.

The accelerator position sensor 31 is electrically coupled to the brake controller 22 and the engine torque controller 32 and indicates the position of an accelerator 40. The accelerator 40 has various positions including a full throttle position. The brake controller 22 automatically releases brake pressure when the accelerator 40 is approximately in the full throttle position. By allowing the brake pressure to be released during full throttle, the operator may perform an alternative precautionary action, other than braking, such as maneuvering the vehicle 12 to avoid a collision. In so doing, the operator is able to react to the situation by accelerating the vehicle without mentally remembering to deactivate the system 10 before manually accelerating the vehicle 12. Therefore, saving time in a potential collision situation and decreasing the probability of a collision. The brake controller 22 may perform a similar function when the vehicle operator performs other precautionary actions. For example, when the operator rotates a vehicle steering wheel (not shown) more than a predetermined rotation angle the brake controller may also automatically release brake pressure.

The ability to increase brake pressure above an autonomously applied brake pressure and the ability to deactivate the system 10 simultaneously in conjunction with performing a precautionary action provides the operator with continuous control over the braking system 24 in a potential collision situation.

The engine torque controller 32 is electrically coupled to the brake controller 22 and is signaled by the brake controller 22 to reduce the engine torque to approximately zero during autonomous braking. Engine torque controller 32 may reduce engine torque by limiting air and fuel supplied to an engine 42. The engine torque controller 32 may also downshift a transmission 44, deactivate an engine ignition system 46, or other methods known in the art to reduce engine torque.

The threat indicator 28 is electrically coupled to the brake controller 22 and the collision controller 17 and may be a recorded value, a switch, or other style indicator representing whether the probability of a collision is greater than a predetermined value. When the probability of a collision is greater than a predetermined value the threat indicator 28 is positive, otherwise it is negative. The threat indicator 28 is used for brake control purposes. The threat indicator 28 may be reset via the collision probability estimator 34, the brake controller 22, or manually by the operator. When the threat indicator 28 is reset and the object detection system 14 is continuing to detect the original detected object the object detection system 14 determines the original detected object to be a false object and returns to an initial state of monitoring for another impending object.

Warning indicator 30 is electrically coupled to the collision controller 17 and generates a collision-warning signal in response to the object detection signal and the collision assessment signal, which is indicated to the vehicle operator. The indicator may include a video system, an audio system, an LED, a light, global positioning system, a heads-up display, a headlight, a taillight, a display system, a telematic system or other indicator. The warning indicator 30 may supply warning signals, collision-related information, external-warning signals to objects or pedestrians located outside of the vehicle, or other pre and post collision information.

The threat indicator 28 and the warning indicator 30 may be separate indicators as shown or may be one in the same.

Figure 2:
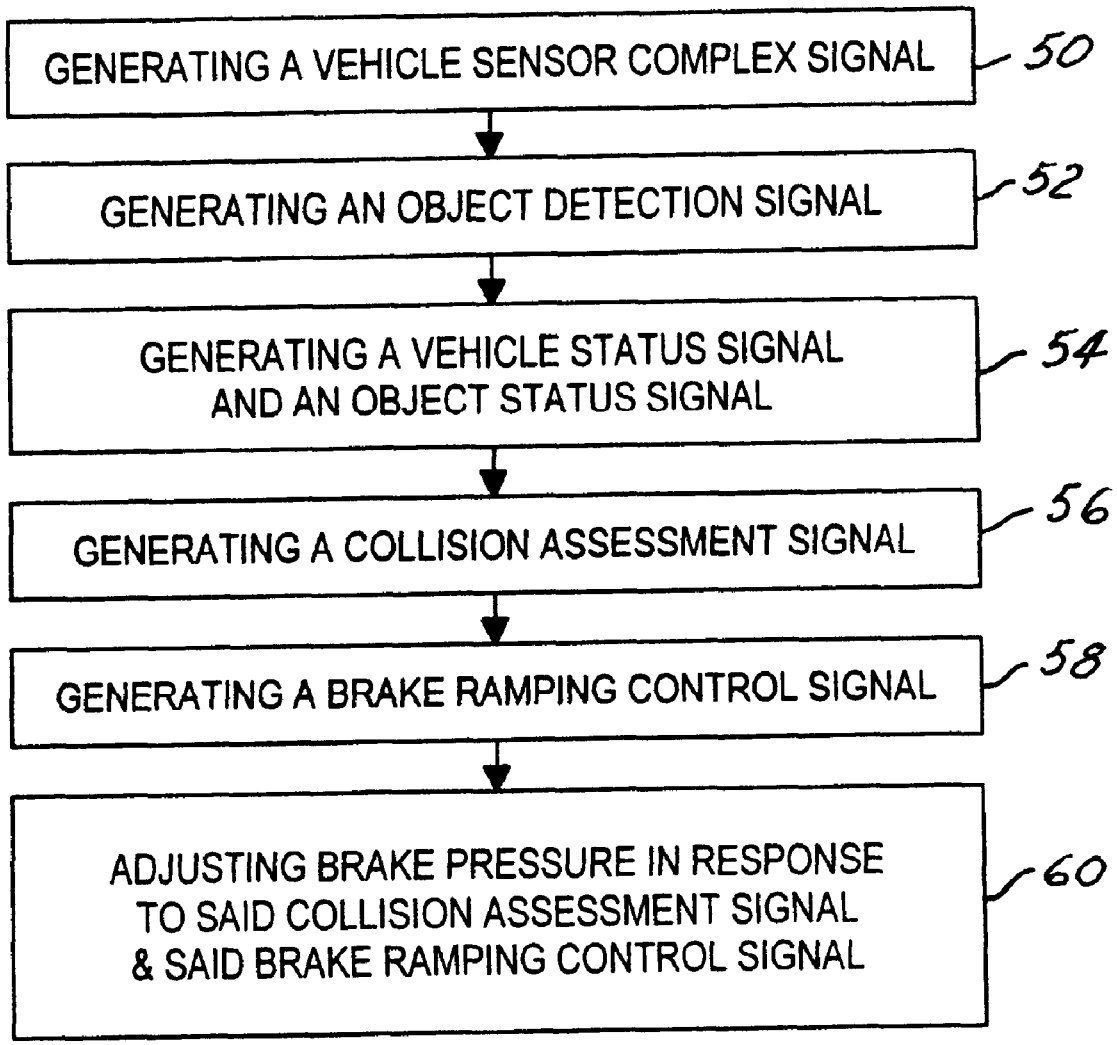
FIG. 2 is a flow diagram illustrating a method of controlling a braking system of the automotive vehicle in accordance with an embodiment of the present invention.

Referring now to FIG. 2, a flow diagram illustrating a method of controlling the braking system 24 of the automotive vehicle 12 in accordance with an embodiment of the present invention is shown.

In step 50, the vehicle sensor complex 16 includes multiple vehicle sensors, as stated above, that are used to describe several vehicle parameters and generate a vehicle sensor complex signal.

In step 52, the object detection system 14 continuously monitors the environment and current situation that the vehicle 12 is encountering to detect an impending object. When an impending object is detected the object detection system 14 generates an object detection signal.

In step 54, the vehicle and object status provider 33 evaluates the object detection signal and the vehicle sensor complex signal and generates an object status signal and a vehicle status signal, respectively. The object status signal may include the location of the object relative to the vehicle 12, the velocity of the object relative to the vehicle, the predicted path of the object, or the spatial point of collision. The vehicle status signal may include signal information from the various signals generated by the sensors in the vehicle sensor complex 16 including the predicted path of the vehicle.

In step 56, the collision probability estimator 34 assesses the probability that a collision may occur in response to the object status signal and the vehicle status signal and generates a collision assessment signal. The collision assessment signal may include a probability that a collision may occur, time until a potential collision may occur, point of collision, impending object prioritization, object identification, and other object and vehicle related parameters.

In step 58, a brake ramping control signal is generated in response to said vehicle status signal, said object status signal, and said collision assessment signal. That is when a collision is impending, braking is provided for collision avoidance. The ramping control signal may vary in amplitude, shape, and duration depending upon various determined vehicle and object parameters. The brake ramping control signal provides smooth transitional braking when impending objects are detected.

In step 60, the brake controller 22 signals the braking system 24 to adjust brake pressure in response to the collision assessment signal and the brake ramping control signal.

The present invention provides an operator of a vehicle with continuous braking control throughout a potential collision situation. The braking control system also provides an operator with increased time to react during a potential collision situation, thereby decreasing the probability of a collision and an injury. The brake control system provides smooth transitional braking with the ability to ramp up and ramp down brake pressure, therefore providing the operator with an autonomous brake actuating system that is more characteristic of normal vehicle operating methods.

The above-described apparatus, to one skilled in the art, is capable of being adapted for various purposes and is not limited to the following systems: forward collision warning systems, collision avoidance systems, vehicle systems, or other systems that may require brake control. The above-described invention may also be varied without deviating from the spirit and scope of the invention as contemplated by the following claims.

What is claimed is:

1. A brake control system for an automotive vehicle comprising:
   a vehicle sensor complex generating a vehicle sensor complex signal;
   an object detection system generating an object detection signal;
   a brake controller electrically coupled to said vehicle sensor complex and said object detection system, said brake controller generating a brake ramping control signal in response to said vehicle sensor complex signal and said object detection signal, said brake controller adjusting brake pressure in response to said brake ramping control signal.

2. A system as in claim 1 further comprising:
an accelerator having a plurality of positions; and
an accelerator position sensor electrically coupled to said accelerator and said brake controller and generating an accelerator position signal;
said brake controller releasing brake pressure in response to said accelerator position signal.

3. A system as in claim 2 wherein said brake controller releases brake pressure when said accelerator is approximately in a full throttle position.

4. A system as in claim 1 further comprising:
a threat indicator electrically coupled to said brake controller having a positive indication and a negative indication;
said brake controller generating a collision assessment signal in response to said vehicle sensor complex signal and said object detection signal;
said brake controller signaling said threat indicator to be positive when said collision assessment signal is greater than a predetermined value and negative when said collision assessment signal is less than or equal to the predetermined value.

5. A system as in claim 4 further comprising a warning indicator electrically coupled to said brake controller and indicating a collision warning signal in response to said collision assessment signal.

6. A system as in claim 4 wherein said threat indicator is reset by at least one of the following: a manual reset button, a throttle position, and a collision assessment signal.

7. A system as in claim 6 wherein said brake controller determines a detected object to be a false object when said threat indicator is reset.

8. A system as in claim 4 wherein said brake controller releases brake pressure when said threat indicator is negative.

9. A system as in claim 4 further comprising an engine torque controller reducing the amount of engine torque in the vehicle in response to said collision assessment signal.

10. A method of controlling a braking system for an automotive vehicle comprising:
generating a vehicle sensor complex signal;
generating an object detection signal;
generating a brake ramping control signal in response to said vehicle sensor complex signal and said object detection signal; and
adjusting brake pressure in response to said brake ramping control signal.

11. A method as in claim 10 further comprising:
generating a vehicle status signal and an object status signal in response to said vehicle sensor complex signal and said object detection signal;
generating a collision assessment signal in response to said vehicle status signal and said object status signal; and
adjusting brake pressure in response to said collision assessment signal.

12. A method as in claim 11 further comprising indicating a collision warning signal in response to said collision assessment signal.

13. A method as in claim 11 further comprising reducing engine torque of the vehicle in response to said collision assessment signal.

14. A method as in claim 10 wherein adjusting brake pressure comprises ramping the brake pressure.

15. A method as in claim 10 further comprising releasing brake pressure when a threat indicator is reset or an accelerator is in approximately a full throttle position.

16. A method as in claim 10 wherein generating a brake ramping control signal comprises:
determining object velocity relative to the vehicle and generating a relative velocity signal;
determining distance between said object and the vehicle and generating a relative distance signal; and
generating said brake ramping control signal in response to said relative velocity signal and said relative distance signal.

17. A method as in claim 10 wherein generating a brake ramping control signal comprises:
determining an object classification and generating an object classification signal; and
generating said brake ramping control signal in response to said object classification signal.

18. A method as in claim 10 wherein generating a brake ramping control signal further comprise limiting the amount of applied brake pressure.

19. A brake control system for an automotive vehicle having a braking system comprising:
a vehicle sensor complex generating a vehicle sensor complex signal;
an object detection system generating an object detection signal;
a collision controller electrically coupled to said vehicle sensor complex and said object detection system and generating a vehicle status signal and an object status signal in response to said vehicle sensor complex signal and said object detection signal;
said collision controller generating a collision assessment signal in response to said vehicle status signal and said object status signal; and
a brake controller electrically coupled to said collision controller comprising;
a brake ramping correlator generating a brake ramping control signal in response to said vehicle status signal and said object status signal;
said brake controller adjusting brake pressure in response to said brake ramping control signal.

20. A system as in claim 19 wherein said braking system further comprising:
a brake pedal having various positions corresponding to various brake pressure levels;
said brake controller when adjusting brake pressure allowing increased brake pressure when said brake pedal position corresponds to a brake pressure level that is greater than an autonomous brake pressure level.

21. A system as in claim 19 further comprising:
a threat indicator electrically coupled to said collision controller having a positive indication and a negative indication;
said collision controller signaling said threat indicator to be positive when said collision assessment signal is greater than a predetermined value and negative when said collision assessment signal is less than or equal to the predetermined value.

* * * * *